(12) United States Patent
Dash et al.

(10) Patent No.: US 8,132,043 B2
(45) Date of Patent: Mar. 6, 2012

(54) MULTISTAGE SYSTEM RECOVERY FRAMEWORK

(75) Inventors: Prasanta Dash, San Jose, CA (US); Samir Desai, Pune (IN)

(73) Assignee: Symantec Corporation, Mountain View, CA (US)

( * ) Notice: Subject to any disclaimer, the term of this patent is extended or adjusted under 35 U.S.C. 154(b) by 23 days.

(21) Appl. No.: 12/641,151

(22) Filed: Dec. 17, 2009

(65) Prior Publication Data
US 2011/0154092 A1      Jun. 23, 2011

(51) Int. Cl.
*G06F 11/00*       (2006.01)
(52) U.S. Cl. .......................................................... 714/4.1
(58) Field of Classification Search ................. 714/2, 3, 714/4.1, 4.11, 4.12, 4.2, 4.21, 4.3, 4.4, 6.11, 714/6.12, 6.13, 6.2, 6.3, 6.31, 11–16, 20–22, 714/32, 33, 39, 47.1, 48
See application file for complete search history.

(56) References Cited

U.S. PATENT DOCUMENTS

| | | | | |
|---|---|---|---|---|
| 5,805,785 A * | 9/1998 | Dias et al. | ....................... | 714/4.4 |
| 6,148,410 A * | 11/2000 | Baskey et al. | ................. | 714/4.11 |
| 6,308,282 B1 * | 10/2001 | Huang et al. | .................... | 714/4.3 |
| 6,311,290 B1 * | 10/2001 | Hasbun et al. | ................... | 714/15 |
| 7,237,140 B2 * | 6/2007 | Nakamura et al. | .............. | 714/4.5 |
| 7,401,265 B2 * | 7/2008 | Bae et al. | ...................... | 714/47.1 |
| 7,596,790 B2 * | 9/2009 | Moakley | ....................... | 718/104 |
| 7,814,373 B2 * | 10/2010 | Bae et al. | ...................... | 714/47.1 |
| 2003/0005102 A1 * | 1/2003 | Russell | ......................... | 709/223 |
| 2009/0172470 A1 * | 7/2009 | Bobak et al. | .................... | 714/16 |
| 2010/0251002 A1 * | 9/2010 | Sivasubramanian et al. | ..... | 714/2 |

* cited by examiner

*Primary Examiner* — Nadeem Iqbal

(57) ABSTRACT

A method and system for multi-staged recovery of a distributed computer system. The method includes receiving a failure event notification from at least one node of the distributed computer system and executing a plurality of recovery stages upon receiving the failure event notification by using a recovery manager, wherein each of the plurality of recovery stages performs a defined recovery task. The progress of recovery is tracked by using at least one state machine executed by the recovery manager, wherein the state machine reflects progress of each of the recovery stages. The progress of recovery is monitored to a completion by using the state machine and the recovery manager.

20 Claims, 10 Drawing Sheets

MULTISTAGE SYSTEM RECOVERY FRAMEWORK

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Companies have come to rely upon high-availability clusters to provide the most critical services and to store their most critical data. In general, there are different types of clusters, such as, for example, compute clusters, storage clusters, scalable clusters, and the like. High-availability clusters (also known as HA Clusters or Failover Clusters) are computer clusters that are implemented primarily for the purpose of providing high availability of services which the cluster provides. They operate by having redundant computers or nodes which are then used to provide service when system components fail. Normally, if a server with a particular application crashes, the application will be unavailable until someone fixes the crashed server. HA clustering remedies this situation by detecting hardware/software faults, and immediately restarting the application on another system without requiring administrative intervention, a process known as Failover. As part of this process, clustering software may configure the node before starting the application on it. For example, appropriate file systems may need to be imported and mounted, network hardware may have to be configured, and some supporting applications may need to be running as well.

HA clusters are often used for critical databases, file sharing on a network, business applications, and customer services such as electronic commerce websites. HA cluster implementations attempt to build redundancy into a cluster to eliminate single points of failure, including multiple network connections and data storage which is multiply connected via storage area networks or Internet protocol-based storage.

However, as the size of the data and the computer requirements continue expand with the growing size of the Internet, large cloud-based computer systems are quickly outstripping the ability of HA clusters to reliably provide backup and fault recovery. The increasing size of modern distributed computer systems requires new solutions to maintain a desired level of reliability.

SUMMARY OF THE INVENTION

Embodiments of the present invention provide a failure recovery framework that can handle multiple serial failures and/or multiple cascaded failures of hardware or software components of the various nodes of a distributed computer system, and initiate a recovery process and monitor and maintain this process to completion.

In one embodiment, the present invention is implemented as a method for multi-staged recovery of a distributed computer system. The method includes receiving a failure event notification from at least one node of the distributed computer system and executing a plurality of recovery stages upon receiving the failure event notification by using a recovery manager (and/or other components), wherein each of the plurality of recovery stages performs a defined recovery task. The progress of recovery is tracked by using at least one state machine executed by the recovery manager, wherein the state machine reflects progress of the recovery stages. The progress of recovery is monitored to a completion by using the state machine and the recovery manager.

In one embodiment, the failure event notification is as a result of a failed node of the distributed computer system or as a result of a failed storage component of a distributed computer system.

In one embodiment, the plurality of recovery stages are scheduled for execution on a plurality of different nodes of the distributed computer system.

In one embodiment, the recovery manager is implemented as a distributed recovery manager across a plurality of nodes of the distributed computer system and the state machine is implemented as a distributed state machine executing concurrently across the plurality of nodes of the distributed computer system.

In one embodiment, the recovery manager schedules a plurality of actions to implement the recovery stages to account for temporal ordering, precedence, exclusion, etc. among the plurality of actions.

In one embodiment, the distributed computer system includes nodes having different operating systems.

In one embodiment, the recovery manager uses a persistently stored database to track the progress of recovery and monitor the progress to the completion.

In one embodiment, the present invention is implemented as a computer readable storage medium having stored thereon, computer executable instructions that, if executed by a computer system cause the computer system to perform a recovery method. The recovery method includes receiving a failure event notification from at least one node of a distributed computer system, and executing a plurality of recovery stages upon receiving the failure event notification by using a recovery manager, wherein each of the plurality of recovery stages performs a defined recovery task. The recovery method further includes tracking a progress of recovery by using at least one state machine executed by the recovery manager, wherein the state machine reflects progress on the performance of each of the recovery stages, and monitoring the progress of recovery to a completion by using the state machine and the recovery manager.

In yet another embodiment, the present invention is implemented as a server computer system, comprising a computer system having a processor coupled to a computer readable storage media and executing computer readable code. The computer readable code causes the computer system to receive a failure event notification from at least one node of a distributed computer system, and execute a plurality of recovery stages upon receiving the failure event notification by using a recovery manager, wherein each of the plurality of recovery stages performs a defined recovery task. The computer readable code causes the computer system track a progress of recovery by using at least one state machine executed by the recovery manager, wherein the state machine reflects progress on the performance of each of the recovery stages, wherein the recovery manager schedules a plurality of actions to implement the recovery stages to account for temporal dependency among the plurality of actions, and monitor the progress of recovery to a completion by using the state machine and the recovery manager.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
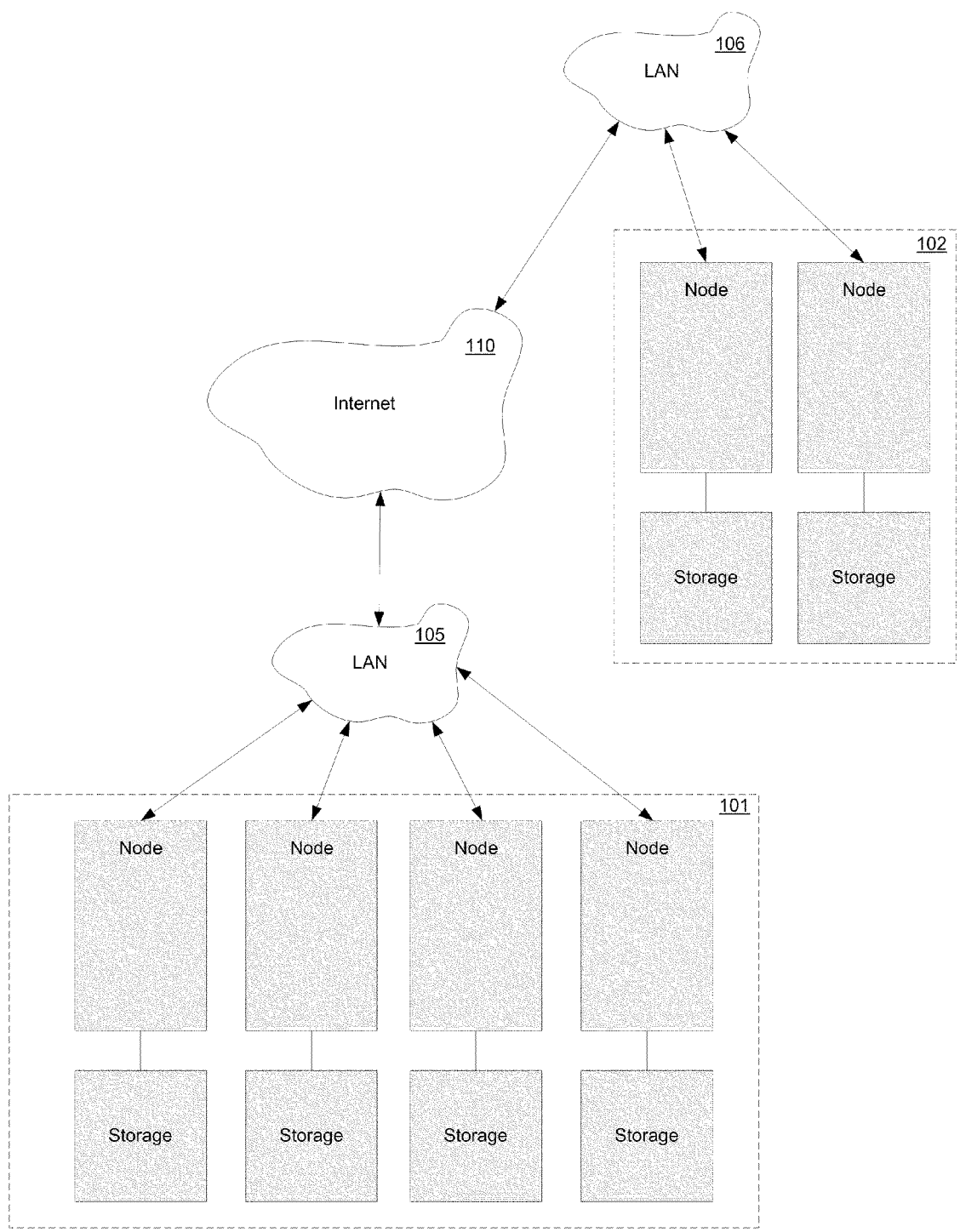
FIG. 1 shows a diagram depicting a high availability cluster-based computing system in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention implement highly reliable and highly scalable distributed computer systems and/or cloud based computer systems comprising numerous storage nodes and numerous computing nodes. Embodiments of the present invention provide a high degree of resiliency by recovering data and services hosted by failed nodes quickly. Embodiments of the present invention provide a framework for recovery that is robust, scalable and extensible. Embodiments of the present invention can implement a recovery manager that itself implements a multi-stage recovery framework to handle complex recovery tasks involving multiple nodes and processes. Embodiments of the multistage recovery framework can, for example, handle concurrent recovery of independent tasks, the serialization of tasks and the restart of tasks in case of failure. Embodiments of the present invention are now described in the context of cluster based computer systems as depicted in FIG. 1 below.

FIG. 1 shows a diagram depicting a high availability cluster-based computing system in accordance with one embodiment of the present invention. As illustrated in FIG. 1, two clusters 101 and 102 are shown. Cluster 102 comprises a two node cluster. Cluster 101 comprises a four node cluster. Each of the constituent nodes is shown connected to a respective storage device (e.g., disk drive, etc.). The nodes of each cluster communicate with one another via local area networks 105 and 106. These local area networks are in turn connected to the Internet 110. Although the embodiments described in the context of clusters of two nodes and four nodes, it should be appreciated that embodiments of the present invention can readily scale and function in distributed computer systems and/or cloud based computer systems having hundreds or thousands of nodes.

Thus, FIG. 1 shows the basic layout of a typical high-availability cluster. As described above, a high availability cluster is a computer cluster that functions primarily by providing high availability of services to users and/or applications. The multiple redundant nodes of each cluster 101-102 are used to provide service in case one or more nodes of a cluster should fail. For example, if a node with a particular application crashes, the application will be unavailable until the node is recovered. HA clustering implements a fail over of the particular application to one of the redundant nodes of the cluster. Embodiments of the present invention ensure the smooth failover of applications to one or more redundant nodes and the smooth and quick recovery of the failed node. This process is made transparent such that the clusters 101 and 102 become essentially self-healing.

Figure 2:
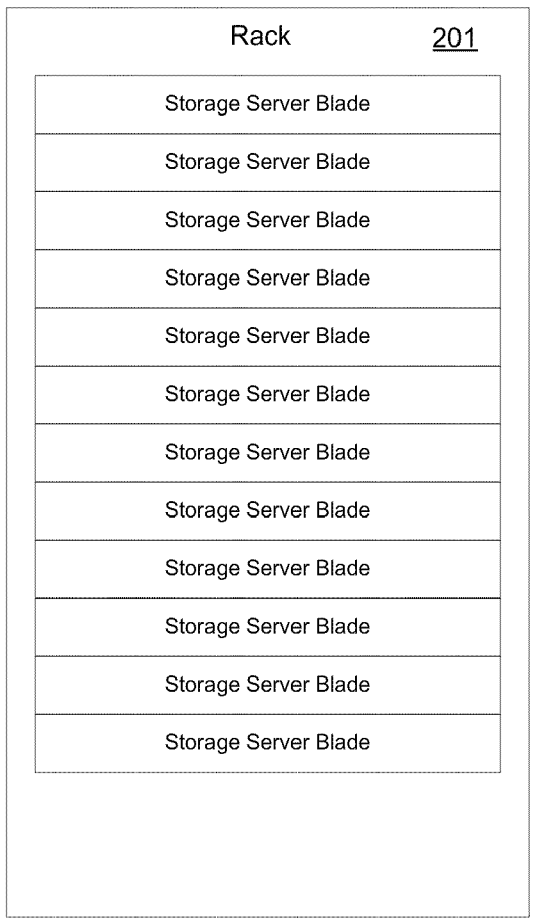
FIG. 2 shows a diagram depicting hardware components of a highly scalable cloud-based computing system in accordance with one embodiment of the present invention.
Figure 2:
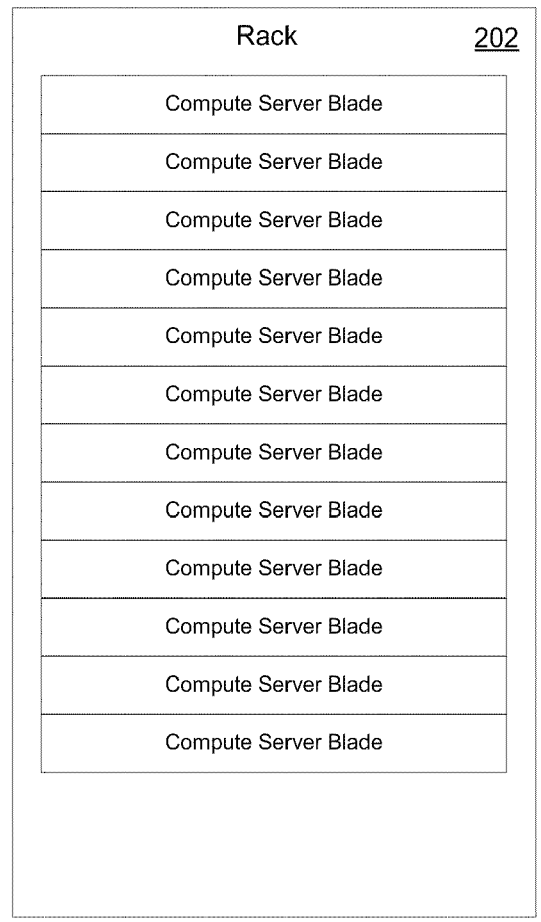

FIG. 2 shows a diagram depicting hardware components of a highly scalable cloud-based computing system in accordance with one embodiment of the present invention. As shown in FIG. 2, a rack 201 and a rack 202 incorporate numerous server blade computer systems. The rack 201 mounts storage server blades. The rack 202 mounts compute server blades. Storage server blades typically incorporate a larger number of storage devices (e.g., disk drives, etc.). They are primarily directed towards storing and serving data objects (e.g., files, etc.). Computer server blades typically incorporate more system memory and more CPU cores. They are primarily directed towards providing compute resources to execute applications. Together, the racks 201-202 and their incorporated server blades are communicatively linked to form a highly scalable cloud based computer system. The hardware components of each server blade and the hardware components of each rack have built-in redundancy to eliminate single points of failure, including multiple network connections and data storage which is multiply connected.

Embodiments of the present invention promote the reliability and resilience of such highly scalable cloud-based computing systems. For example, the FIG. 2 embodiment can be built with a large number of commodity components (e.g., off-the-shelf server blades). The commodity nature of such commodity components typically implies a higher likelihood of individual components failing. While recovery is ongoing for one or more components, other components and/or service might fail. Example of failures include, a data server failure, a storage device failure in one or more data servers, a client failure, network connectivity loss, the failure of one or more provide services, and the like.

Recovery from some errors can be as simple as restarting services on the affected node. Other failures can require recovery/reconstruction of data, reclaim of data access locks, server load rebalancing and other actions. Embodiments of the present invention ensure a recovery is closely coordinated between nodes. Embodiments of the present invention ensure that if process driving the recovery fails, the process is restarted from a last known good state. The recovery is highly scalable. In one embodiment, the processes that drive the recovery are distributed across multiple available nodes.

Figure 3:
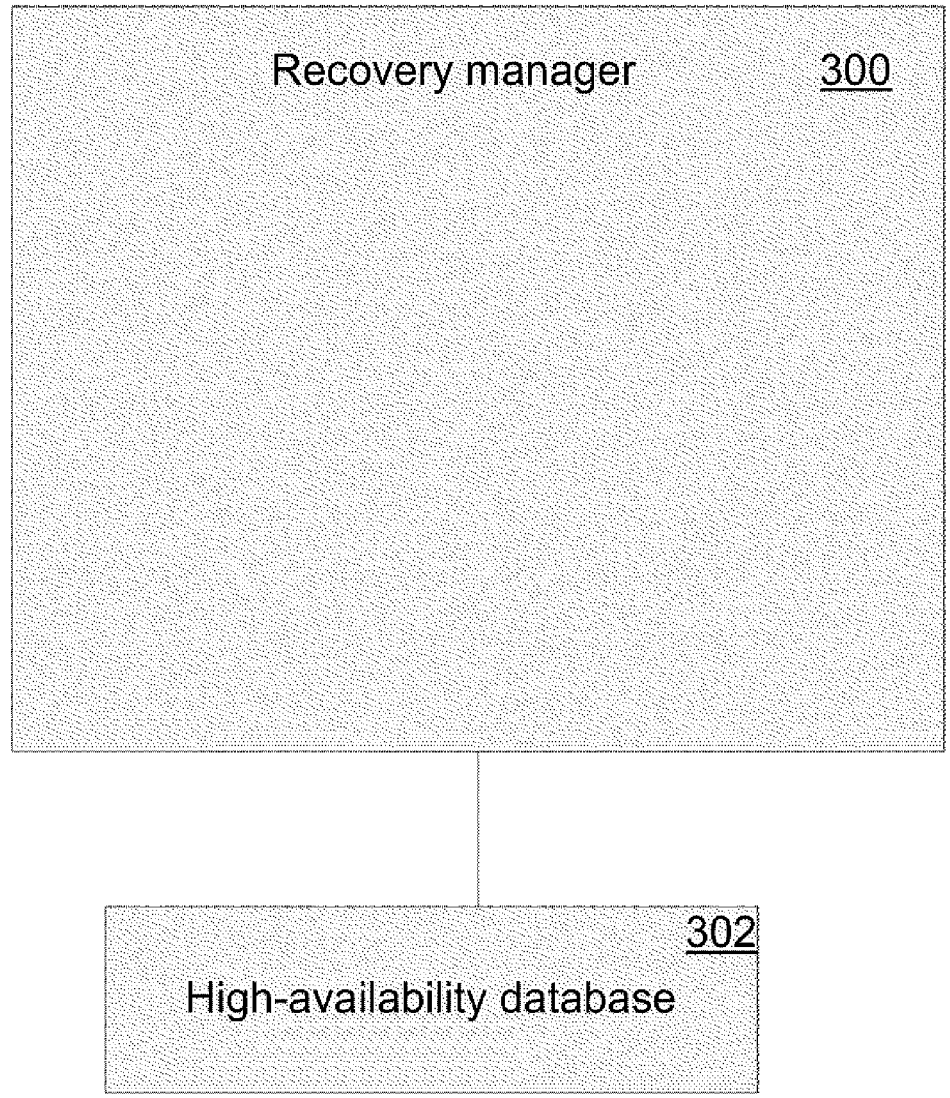
FIG. 3 shows a diagram of a recovery manager in accordance with one embodiment of the present invention.

FIG. 3 shows a diagram of a recovery manager 300 in accordance with one embodiment of the present invention.

In one embodiment, the recovery process is driven by the recovery manager 300. The recovery manager 300 comprises a software-based daemon running on at least one of the nodes of a cluster. In one embodiment, the daemon is made highly available through process monitoring (e.g., restart on exit) and failover. The recovery manager, in this case, receives notification from various sources and generates appropriate events and tasks. If a notification is critical to recovery it is persistently recorded before the daemon acknowledges the notification. The sender will resend the notification if required, until it gets acknowledgement from the recovery daemon. The recovery daemon is configured to handle duplicate notification (if detectable) appropriately.

The recovery manager uses a highly available database 302 to persistently store information pertaining to recovering the system from any fault or failure events. In a case where the node hosting the recovery manager 300 itself fails, the database 302 itself is recovered first, before any other recovery processing starts. The health and state data of most of the components comprising the cluster are recorded in the database 302. When the health/state of any component changes, the recovery manager ensures the appropriate hosts/processes are notified of the change. If a host or process is down or is not running, the host or process gets the latest status for each component when it restarts.

Subsequently that host can update in-core state (if any) based on a notification from the recovery manager. When the health/state of a component changes, the recovery manager might queue one or more recovery tasks. For example, in one scenario the recovery manager may delete pending recovery tasks based on the nature of an event or state change. Alternatively, the recovery manager may choose to abort any ongoing recoveries if the state change has a direct bearing upon it. State change as well as queue/de-queue of recovery tasks are done atomically by making it part of same database transaction.

Figure 4:
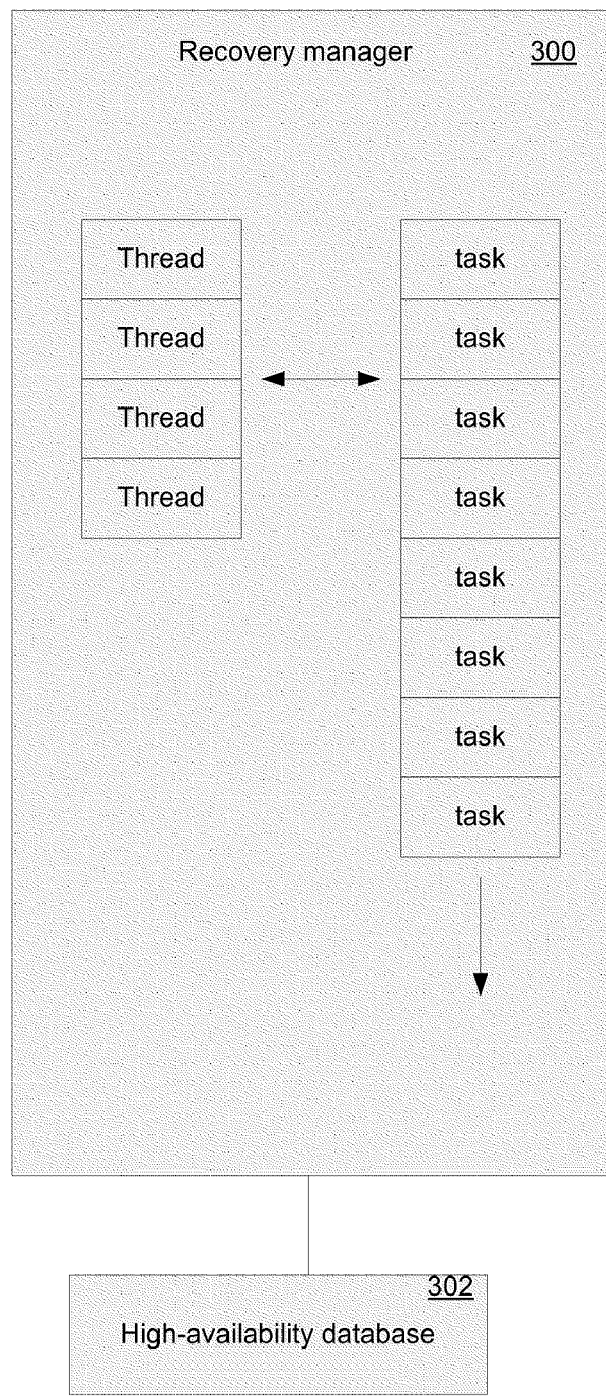
FIG. 4 shows a diagram depicting the recovery manager executing a plurality of threads which operate on a queue of multiple tasks in accordance with one embodiment of the present invention.

FIG. 4 shows a diagram depicting the recovery manager 300 executing a plurality of threads which operate on a queue of multiple tasks in accordance with one embodiment of the present invention.

In the FIG. 4 embodiment, one or more threads shown running on the recovery manager drive and/or initiate the recovery process. These threads inspect the queued tasks and any associated task data to evaluate dependency, order and priority. Tasks that can be done in parallel are picked up by multiple threads (e.g., the recovery of multiple file systems). Tasks that need to be serialized wait for other tasks to complete (e.g., node join processing has to wait until node leave processing for this and possibly other nodes to complete). If a specific task can be completed quickly it is done in the context of a recovery thread. Tasks that take longer to complete cause the creation of a task specific thread for execution. The task specific thread sends its completion indication back to the recovery manager asynchronously when it completes. Tasks that are idempotent (e.g., repeated applications have the same effect as one) can be monitored by a process and restarted if needed. These tasks will be restarted if recovery manager crashes. For other tasks, the state of the task might be updated before, during and after the recovery task processing. When the recovery task is complete, an appropriate state change is made and recovery task is updated or deleted.

Figure 5:
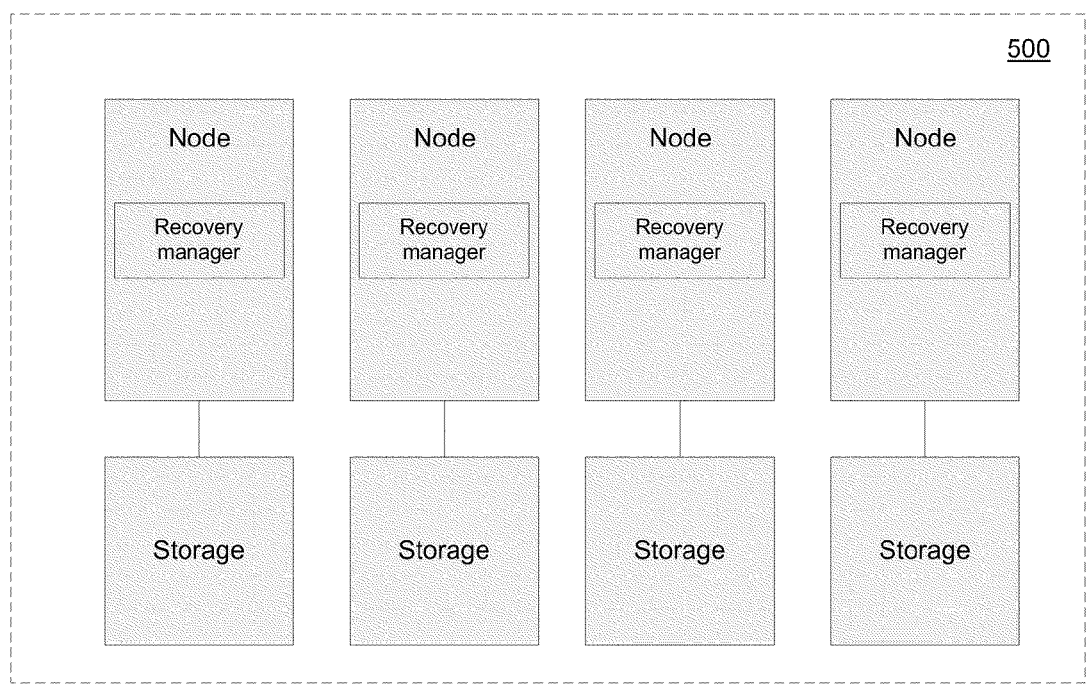
FIG. 5 shows a diagram depicting a cluster having a recovery manager distributed across each node in accordance with one embodiment of the present invention.

FIG. 5 shows a diagram depicting a cluster 500 having a recovery manager distributed across each node in accordance with one embodiment of the present invention. As illustrated in the FIG. 5 embodiment, owing to distributed nature of the architecture, a recovery task often involves starting recovery on more than one node. In such cases, all tasks are started on all nodes and each recovery manager looks for responses from all nodes.

In one embodiment, to account for cascaded failures, the recovery manager is configured to wait for a variable amount of time (depending upon task). If an operation does not complete in timely manner in one or more nodes, recovery restarts at a known good point.

It should be noted that, in one embodiment, communication/interaction between tasks can be implemented using RPC (remote procedure calls) or other Inter-Process Communication (IPC) mechanisms.

In some cases, a specific recovery task often involves multiple subtasks, which need to be sequentially performed. Embodiments of the present invention implement a multi-stage recovery framework, where a plurality of tasks are started in multiple threads (or processes). The recovery manager subsequently waits for each of them to complete. For example, if a subtask at this stage was successful, the recovery manager moves on to the next stage, which performs a different subtask on possibly a different set of nodes. Depending upon the task and nature of the failure, the framework might restart the stage over again (possibly with new set of parameters), or go back to the beginning or some intermediate stage.

It should be noted that in some cases, a special abort or cleanup stage is required in order to restart from the beginning. It is also possible that the recovery tasks running on different nodes will not be able to make progress if there is a cascaded failure. This requires the recovery framework to remain responsive even if individual subtasks might not be. In one embodiment, the recovery framework can do appropriate notification/cancellation of ongoing recoveries through an appropriate IPC mechanism. In such an embodiment, individual subtasks handle duplicate notification appropriately.

In one embodiment, the recovery framework updates the database (e.g., database 302) at suitable points to log status and establish recovery checkpoints (for restart). It also enables progress tracking and recovery control if manual intervention is required. The framework allows multiple concurrent recoveries to start and complete without interference. The framework readily allows the addition of different types of recovery (e.g., it is readily extensible).

Figure 6:
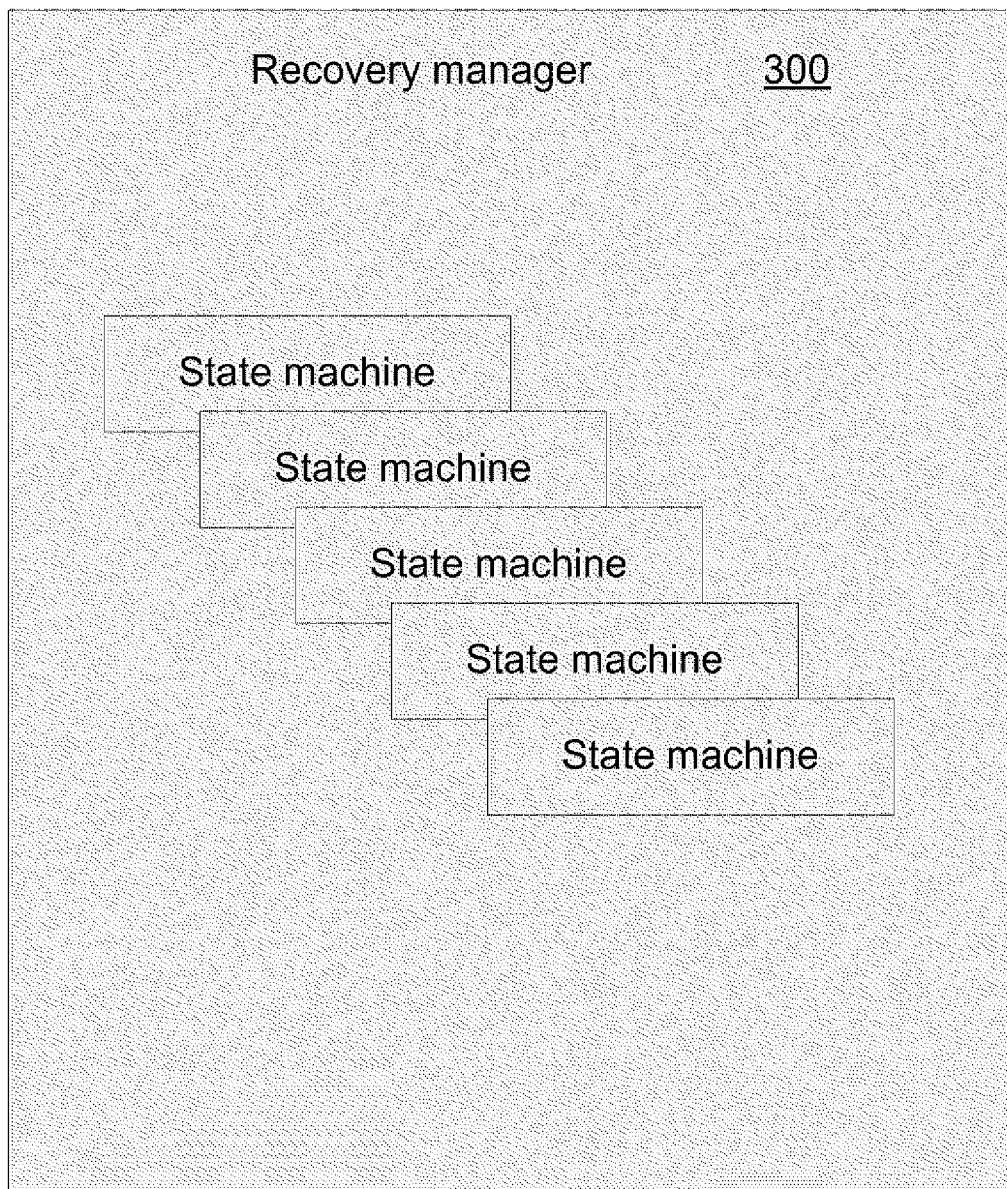
FIG. 6 shows a diagram of the recovery manager executing a plurality of state machines for tracking recovery status of the cluster in accordance with one embodiment of the present invention.

FIG. 6 shows a diagram of the recovery manager 300 executing a plurality of state machines for tracking recovery status of the cluster in accordance with one embodiment of the present invention.

As described above, and as shown in the FIG. 6 embodiment, the recovery framework is modeled as a distributed, multiple concurrent state machine instantiated across multiple nodes of the cluster (e.g., each node having a recovery manager). Each node tracks states of local/global interest. For example a data server might track state of other data servers to which it forwards data, and might track the state of peer data servers which store data for file systems. In one embodiment, one of the recovery managers can implement a central management service that is backed up on a high availability database. The central management service tracks the state of various nodes, storage units, file systems etc.

Embodiments of the present invention take advantage of the fact that one can define attributes for data servers, clients, storage units, file systems, etc. For example a LUN (logical unit number) can have attributes that can be associated with corresponding states (e.g., online/offline/recovery, etc.). Others similar attributes might describe the status of the data on the LUN, such as, for example, uninitialized/healthy/corrupt/dataloss/atrisk. In one embodiment, most elements are described by "health" and "status", whereby the former describes "sticky" attribute/state typically of interest to administrators and the later describes transient state typically associated with up/down events and in most cases automatically heals.

The state transitions of the state machines are driven by events. Complex interaction between various components are abstracted by mapping those to one or more events. Exemplary events include, among other things, nodes going down; Temporary/Permanent (perceived) Storage Unit (LUN) failure; network connectivity loss (symmetric/asymmetric/partition); Tansient/Permanent failure of a Service/Process; Completion/non-completion of a Operation/Task. Multiple failures may occur at the same time, one after another or even during processing of one or more prior events.

One of the primary functions of recovery processing involves collecting events from various sources and acting upon them based on a designated policy. As described above, the recovery manager needs to ensure events are not lost and that duplicate events are properly handled. In one embodiment, the persistency requirements for events are classified into "none" (e.g., losing a host up event might be OK if there are other ways we will figure it out), "incore" (e.g., if the process crashes, it would do the right thing on restart; or process failure event will trigger appropriate action), "transient" (e.g., process saves state in kernel and retrieve it on restart), "local" (e.g., event will survive node reboot), "global" (e.g., event will survive cluster reboot or complete power loss). In some cases, a process might crash before storing state, or a node might crash before an event could be registered globally. In such cases, state machines at various locations (e.g., at recovery managers distributed across the different nodes) will take appropriate action (e.g., such as assigning unique ID, retrying) to ensure proper handling of the event until it reaches the destined location.

In one embodiment, event processing takes into account among other things, such as, for example, temporal ordering (involving dual timestamps, at source and at queuing). For example, if host down followed by host up events are received, the final host state would be up, but we may need to perform recovery for "down" event. If host up is followed by host down events are received, the final host state would be down, but we may skip recovery for "up" event.

In one embodiment, event processing takes into account precedence (implicit or explicit). We might need to process "MDS" up/down (e.g., metadata server) processing before handling DS up/down processing. Events are classified into different precedence levels. Temporal ordering may be preserved within same precedence level (identical/compatible events might be clubbed), but ignored across levels.

In one embodiment, the processing of events could lead to changing health/state of multiple objects. A DATA SERVER going down would impact health/state of data servers, all LUNs in the data server, and all file systems sharing the LUNs. Event processing could lead to further events being generated. For example, a data server down event might be notified to all database servers, clients, and data servers. The processing of the original event (or secondary events generated by it) might spawn one or more recovery tasks. For example to handle LUN failure we might have to recover all file systems using it, that would entail starting recovery tasks on the MDS nodes where the file systems are mounted.

In one embodiment, recovery tasks are tracked and monitored at various levels and restarted if necessary. The centralized management service is aware which file system is mounted where and hence what recovery tasks are spawned. A metadata server might acknowledge to the centralized management service that recovery has started and respond back when recovery is complete for various file systems, thus it would be tracking progress of those tasks.

In one embodiment, for the sake of efficiency of the data recovery, a metadata server might set appropriate state in various object of a data server and declare recovery is complete. In such cases, the data server is responsible for actual recovery and the central management service might need to probe progress of recovery tasks in various data servers. Completion of individual recovery tasks and/or failure to complete (along with reason) are treated as events. Multiple recovery task completion events could lead to state of various objects being updated, one or more recovery tasks being completed/de-queued. Failure of one or more recovery subtasks could lead to recovery task being treated as failure/partial success and re-queued for processing (possibly after other higher priority events are processed first).

In one embodiment, many of the recovery tasks are multistaged. Initial processing starts on the centralized management service, parts of the task is done in a specific node (for example the node where the file system is mounted). Parts of the processing may be done in all metadata servers, partly in all data servers, some parts in one data saver node and some processing in centralized management service node. Each stage transition may be performed "in-core" or may be associated with explicit state change associated with the recover task (individual subtask completion events driving the state change). Recovery for multiple such tasks (e.g., for multiple LUNs of one or more data servers) might be in progress concurrently.

In one embodiment, failures are handled by analyzing the failure reason, inspecting the object state to determine if it was likely caused by a recent state change. In some cases the recovery is restarted at the current stage (of a multi stage processing). Recovery might need to be started all over again. Recovery might need to be failed (to be re-queued). Some recovery tasks might abort on error (return failure). Other recovery tasks might not complete on certain failure scenarios, in such cases we need to generate "abort" tasks upon receiving corresponding event notification. As described above, since recovery tasks might be restarted, processing nodes may implement implicit/explicit recovery checkpoints. If certain nodes fail to complete or respond to recovery subtasks in time bound manner, they might need to be evicted/fenced to allow recovery to make progress/complete.

Figure 7:
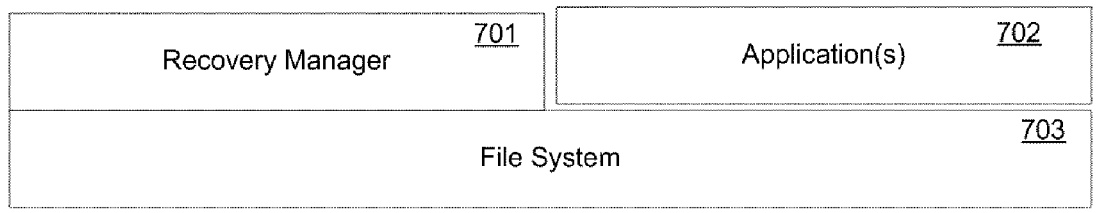
FIG. 7 shows a diagram depicting a recovery manager implemented in user address space in accordance with one embodiment of the present invention.

FIG. 7 shows a diagram depicting a recovery manager 701 implemented in user address space in accordance with one embodiment of the present invention. In the FIG. 7 embodiment, the recovery manager 701 is within application memory space with other applications 702, outside of the protected kernel 703. As shown in FIG. 7, the file system 703 is within kernel space. Thus there is one context switch between user mode and kernel mode as the recovery manager interfaces with the file system. In this configuration, the code comprising the file system kernel can be kept in a comparatively stable state. File system kernel code tends to be extensively debugged and extensively tested. This provides great incentives to maintain kernel code stability.

Figure 8:
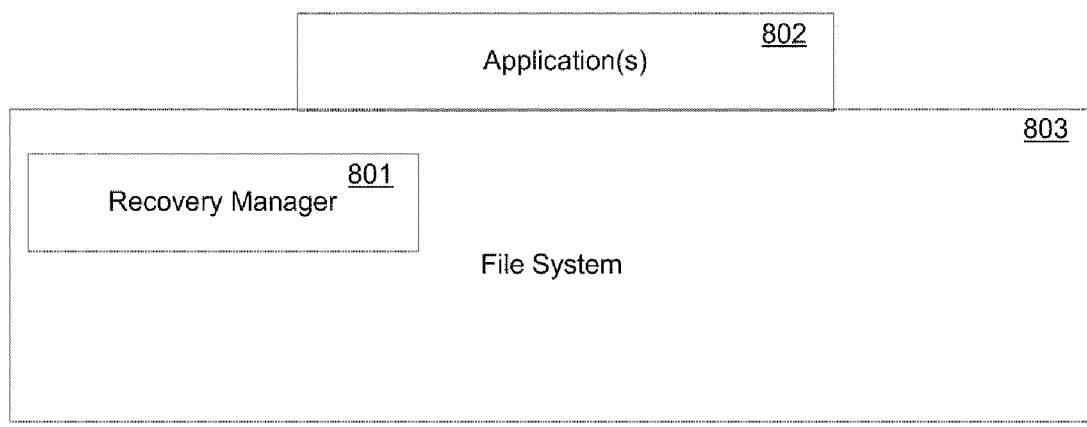
FIG. 8 shows a diagram depicting a recovery manager implemented in kernel address space in accordance with one embodiment of the present invention.

FIG. 8 shows a diagram depicting a recovery manager 801 implemented in kernel address space in accordance with one embodiment of the present invention. As shown in FIG. 8, both the recovery manager 801 and the file system 803 are implemented as kernel mode components, while the applications 802 remains a user mode component. This configuration provides advantages in that there are no context switches on communication between the recovery manager and file system. However, this configuration has disadvantages in that the stability of the kernel and file system code has been disturbed.

It should be noted, however, that certain embodiments can be implemented where certain components of the recovery manager reside in both kernel address space and user address space.

Figure 9:
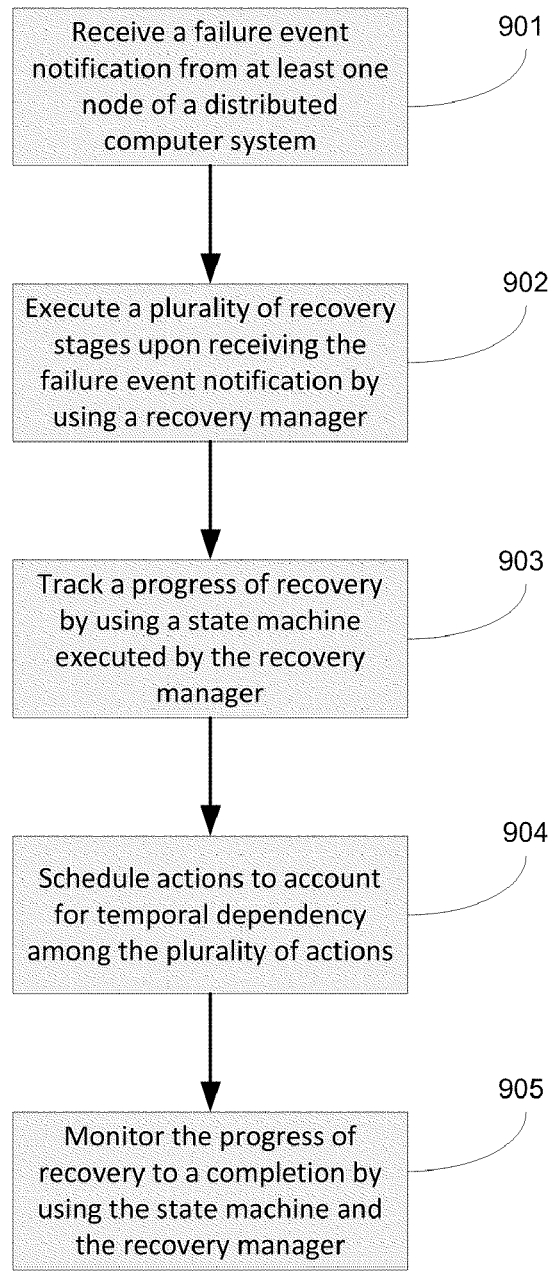
FIG. 9 shows a flowchart of the steps of a process in accordance with one embodiment of the present invention.

FIG. 9 shows a flowchart of the steps of a process 900 in accordance with one embodiment of the present invention. As depicted in FIG. 3, process 300 shows the operating steps of the exemplary periodic replication system 100 in accordance with one embodiment of the present invention.

Process 900 begins in step 901, where the recovery manager receives a failure event notification from at least one node of the distributed computer system. In step 902, a plurality of recovery stages are executed upon receiving the failure event notification by using a recovery manager, wherein each of the plurality of recovery stages performs a defined recovery task. In step 903, the progress of recovery is tracked by using a state machine executed by the recovery manager. As described above, the state machine reflects progress on the performance of each of the recovery stages. In step 904, actions that implement the recovery stages are scheduled to account for temporal dependency among the actions. And in step 905, the progress of recovery is monitored to a completion by using the state machine and the recovery manager.

Figure 10:
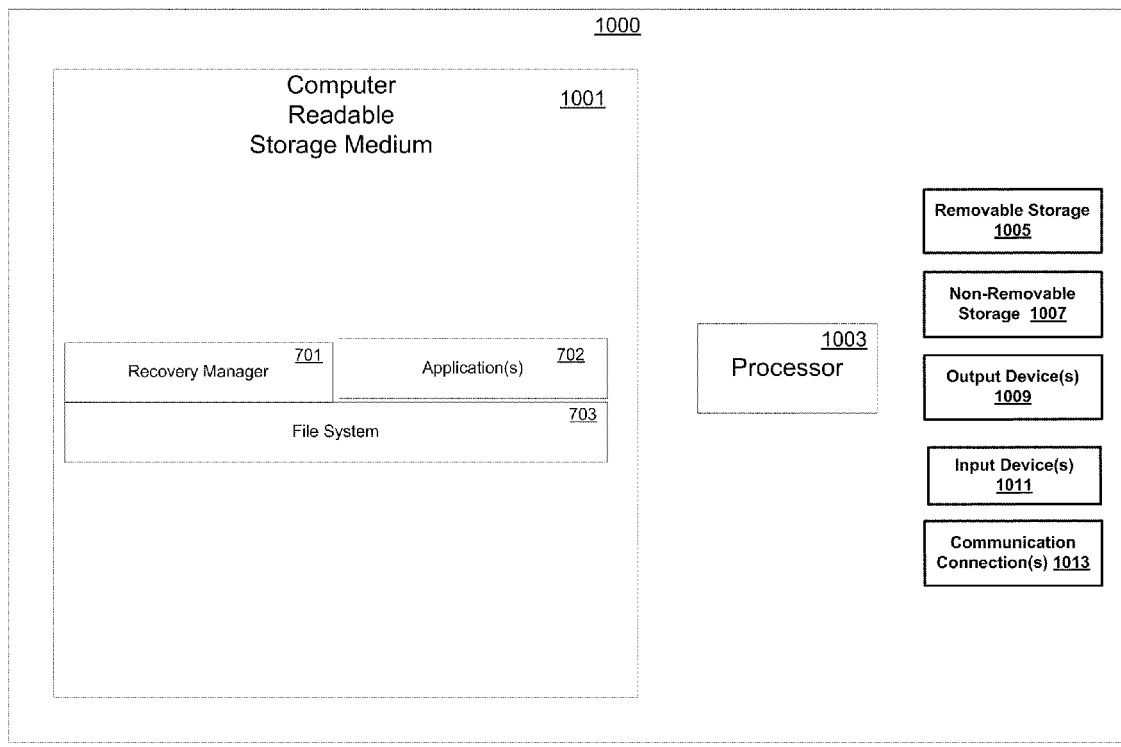
FIG. 10 shows an exemplary computer system in accordance with one embodiment of the present invention.

FIG. 10 shows an exemplary computer system 1000 according to one embodiment. Computer system 1000 depicts the components of a basic computer system providing the execution environment for certain hardware-based and software-based functionality for the above described embodiments. For example, computer system 1000 can be a system upon which the one or more software stacks (e.g., components 701-703) from FIG. 7 are instantiated. Computer system 1000 can be implemented as, for example, a server computer system, workstation computer system, desktop computer system, or laptop computer system. Similarly, computer system 1000 can be implemented as a handheld device. Computer system 1000 typically includes at least some form of computer readable media (e.g., computer readable storage medium 1001). Computer readable media can be a number of different types of available media that can be accessed by computer system 1000 and can include, but is not limited to, computer storage media.

In its most basic configuration, computer system 1000 typically includes processing unit 1003 and memory 1001. Depending on the exact configuration and type of computer system 1000 that is used, memory 1001 can be volatile (e.g., such as DRAM, etc.) 1001a, non-volatile 1001b (e.g., such as ROM, flash memory, etc.) or some combination of the two. Similarly, the memory 1001 can comprise other devices besides solid-state devices, such as, for example, magnetic disk-based media, optical media, or the like.

Additionally, computer system 1000 can include other mass storage systems (e.g., removable 1005 and/or non-removable 1007) such as magnetic or optical disks or tape. Similarly, computer system 1000 can include input devices 1009 and/or output devices 1011 (e.g., such as a display). Computer system 1000 can further include network connections 1013 to other devices, computers, networks, servers, etc. using either wired or wireless media. As all of these devices are well known in the art, they need not be discussed in detail.

It should further be noted, that the computer system 1000 can have some, most, or all of its functionality supplanted by a distributed computer system having a large number of dispersed computing nodes, such as would be the case where the functionality of the computer system 1000 is partly or wholly executed using a cloud computing environment.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for multi-staged recovery of a distributed computer system, comprising:
   receiving a failure event notification from at least one node of the distributed computer system;
   executing a plurality of recovery stages upon receiving the failure event notification by using a recovery manager, wherein each of the plurality of recovery stages performs a defined recovery task;
   tracking a progress of recovery by using at least one state machine executed by the recovery manager, wherein the state machine reflects progress of each of the recovery stages; and
   monitoring the progress of recovery to a completion by using the state machine and the recovery manager.

2. The method of claim 1, wherein the failure event notification is as a result of a failed node of the distributed computer system as a result of a failed storage component of a distributed computer system.

3. The method of claim 1, wherein the plurality of recovery stages are scheduled for execution on a plurality of different nodes of the distributed computer system.

4. The method of claim 1, wherein the recovery manager is implemented as a distributed recovery manager across a plurality of nodes of the distributed computer system and the state machine is implemented as a distributed state machine executing concurrently across the plurality of nodes of the distributed computer system.

5. The method of claim 1, wherein the recovery manager schedules a plurality of actions to implement the recovery stages to account for temporal dependency among the plurality of actions.

6. The method of claim 1, wherein the distributed computer system includes nodes having different operating systems.

7. The method of claim 1, wherein the recovery manager uses a persistently stored database to track the progress of recovery and monitor the progress to the completion.

8. A computer readable storage medium having stored thereon, computer executable instructions that, if executed by a computer system cause the computer system to perform a method comprising:
   receiving a failure event notification from at least one node of a distributed computer system;
   executing a plurality of recovery stages upon receiving the failure event notification by using a recovery manager, wherein each of the plurality of recovery stages performs a defined recovery task;
   tracking a progress of recovery by using at least one state machine executed by the recovery manager, wherein the state machine reflects progress of each of the recovery stages; and
   monitoring the progress of recovery to a completion by using the state machine and the recovery manager.

9. The computer readable storage medium of claim 8, wherein the failure event notification is as a result of a failed node of the distributed computer system as a result of a failed storage component of a distributed computer system.

10. The computer readable storage medium of claim 8, wherein the plurality of recovery stages are scheduled for execution on a plurality of different nodes of the distributed computer system.

11. The computer readable storage medium of claim 8, wherein the recovery manager is implemented as a distributed recovery manager across a plurality of nodes of the distributed computer system and the state machine is implemented as a distributed state machine executing concurrently across the plurality of nodes of the distributed computer system.

12. The computer readable storage medium of claim 8, wherein the recovery manager schedules a plurality of actions to implement the recovery stages to account for temporal dependency among the plurality of actions.

13. The computer readable storage medium of claim 8, wherein the distributed computer system includes nodes having different operating systems.

14. The computer readable storage medium of claim 8, wherein the recovery manager uses a persistently stored database to track the progress of recovery and monitor the progress to the completion.

15. A server computer system, comprising:
   a computer system having a processor coupled to a computer readable storage media and executing computer readable code which causes the computer system to:
   receive a failure event notification from at least one node of a distributed computer system;
   execute a plurality of recovery stages upon receiving the failure event notification by using a recovery manager, wherein each of the plurality of recovery stages performs a defined recovery task;
   track a progress of recovery by using at least one state machine executed by the recovery manager, wherein the state machine reflects progress of each of the recovery stages, wherein the recovery manager schedules a plurality of actions to implement the recovery stages to account for temporal dependency among the plurality of actions; and
   monitor the progress of recovery to a completion by using the state machine and the recovery manager.

16. The server computer system of claim 15, wherein the failure event notification is as a result of a failed node of the distributed computer system as a result of a failed storage component of a distributed computer system.

17. The server computer system of claim 15, wherein the plurality of recovery stages are scheduled for execution on a plurality of different nodes of the distributed computer system.

18. The server computer system of claim 15, wherein the recovery manager is implemented as a distributed recovery manager across a plurality of nodes of the distributed computer system and the state machine is implemented as a distributed state machine executing concurrently across the plurality of nodes of the distributed computer system.

19. The server computer system of claim 15, wherein the distributed computer system includes nodes having different operating systems.

20. The server computer system of claim 15, wherein the recovery manager uses a persistently stored database to track the progress of recovery and monitor the progress to the completion.

* * * * *